United States Patent

[11] 3,586,403

| [72] | Inventor | Merritt S. Cooley |
| | | 12945 Ratallee Road, Davisburg, Mich. 48019 |
| [21] | Appl. No. | 822,885 |
| [22] | Filed | May 8, 1969 |
| [45] | Patented | June 22, 1971 |

[54] BEARING SUPPORT AND SEAL
4 Claims, 3 Drawing Figs.

[52] U.S. Cl. ............................................. 308/187.1, 308/184
[51] Int. Cl. ..................................................... F16c 33/78, F16c 19/04
[50] Field of Search ........................................ 308/184, 237, 187.1

[56] References Cited
UNITED STATES PATENTS

| 2,251,228 | 7/1941 | Leister | 308/184 |
| 2,618,520 | 11/1952 | Anderson et al. | 308/184 |
| 2,986,432 | 5/1961 | Schlarich | 308/184 |
| 3,415,500 | 12/1968 | Pethis | 308/184 |

FOREIGN PATENTS

| 1,101,288 | 4/1955 | France | 308/184 |

Primary Examiner—Fred C. Mattern, Jr.
Assistant Examiner—Frank Susko
Attorney—Barnard, McGlynn & Reising ABSTRACT: A bearing support and sealing member comprising a body of resilient plastic material with an opening formed therein for receiving an axle shaft, and a bearing supporting recess formed in the body coaxial with the axle receiving opening such that an axle and bearing assembly mounted in the member are sealed from moisture and are resiliently supported on the body of a vehicle.

PATENTED JUN 22 1971

3,586,403

INVENTOR.
Merritt S. Cooley
BY
Barnard, McGlynn & Reising
ATTORNEYS

BEARING SUPPORT AND SEAL

This invention relates generally to mounting and sealing members for shaft bearings, and is particularly concerned with a bearing support and sealing member for supporting the axle shaft of a vehicle of the type suitable for off-the-road use on sand, snow, or in swamps and mud.

A problem encountered in the construction and manufacture of vehicles primarily for off-the-road use is that of supporting and sealing the axle on the body of such vehicles, the body frequently being of molded plastic material. High shock loads are frequently encountered by such vehicles particularly when travelling over rough terrain; and when travelling through swamps and streams, it is necessary that the axle mountings be sealed to prevent the introduction of water into the body of the vehicle.

It is therefore an object of this invention to provide a bearing support and sealing member for resiliently supporting an axle and bearing assembly to absorb shock loads, and at the same time providing a watertight seal for the assembly.

The foregoing, and other objects, are achieved by the provision of a sealing member having a body of resilient organic polymeric material having a pair of side surfaces with an axle-receiving opening formed in the body extending from one of the side surfaces, and a bearing supporting recess formed in the body coaxial with and larger than the axle-receiving opening, and extending from the other side surface of the body, An integral sealing rib projects from the periphery of one end of the opening into the bearing recess. When the resilient plastic body, which may be of urethane, nylon, or the like, is mounted on a vertical supporting panel of the vehicle body in coaxial relationship with an axle-receiving opening in the body, a bearing assembly is mounted in the bearing supporting recess between the end wall of the recess and the supporting panel such that the integral sealing rib formed on the body is compressed by the bearing to provide a watertight seal. The axle is received in the bearing assembly and the resilient supporting member acts as a shock absorber permitting resilient movement of the axle relative to the vehicle body in a direction transverse to the axis of the axle.

Other objects, advantages and features of the invention will become apparent from the following description, taken in connection with the accompanying drawings in which.

Figure 1:
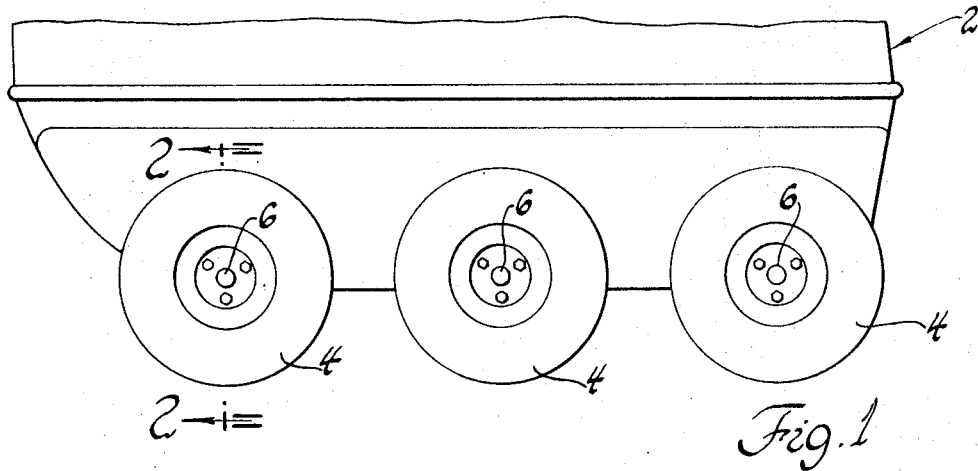
FIG. 1 is an elevational view of a portion of a vehicle having a bearing support and sealing assembly according to the present invention.
Figure 2:
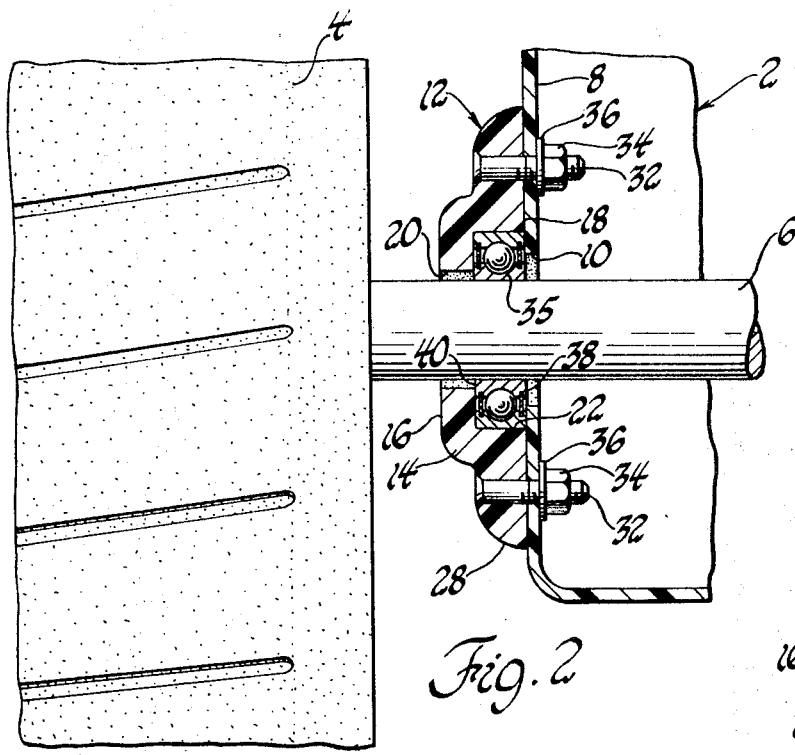
FIG. 2 is a sectional view taken on lines 2-2 of FIG. 1.

In FIG. 1, reference numeral 2 designates the molded plastic body of a utility vehicle having wheels 4 which may be in the form of balloon tires, the wheels 4 each being supported on an axle shaft indicated by reference numeral 6. As shown in FIG. 2, the vehicle body 2 includes a vertical supporting panel 8 having an axle or shaft receiving opening 10 formed therein. It is apparent that as the vehicle travels over rough terrain, shock loads will be encountered tending to cause the axle 6 to move transversely to its axis relative to the supporting panel 8. It is also apparent that with this type of vehicle, there will be periods of use in which the portion of the axle 6 projecting externally of the body 2 will be wholly or partially submerged in water or mud. It is thus necessary to provide a support for the axle 6 that will provide shock absorbance between the axle 6 and supporting panel 8 and at the same time prevent the entry of water into the interior of the vehicle body 2 through the opening 10.

Thus, fig. 2 shows the combination with the vehicle body portion in the form of the vertical panel 8 with an axle-receiving opening 10 therein of a bearing support and sealing member designated collectively by reference numeral 12. Member 12 comprises a body 14 of resilient plastic material having a pair of spaced side surfaces 16 and 18. An axle- or shaft-receiving opening 20 is formed in the body 14 which is positioned in coaxial relationship with the axle-receiving opening 10 in panel 8, the axle-receiving opening 20 in body 14 extending from the side surface 16 toward the panel 8. A bearing supporting recess 22 as formed in body 14 coaxial with and larger than the axle receiving opening 20 and extends from side surface 18 of body 14. An axially projecting, integral sealing rib 24 surrounds the end of the axle-receiving opening 20 in body 14 which communicates with recess 22, rib 24 projecting axially into recess 22 (FIG. 3).

Figure 3:
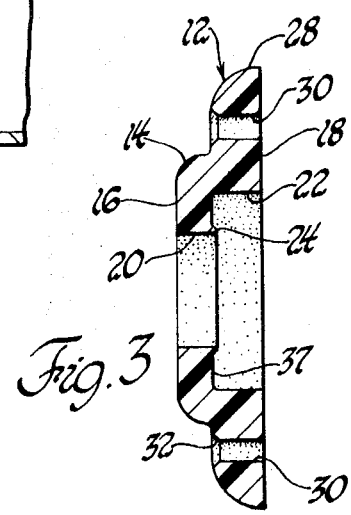
FIG. 3 is a sectional view of a bearing support and sealing member according to the invention.

Thus, with reference to FIG. 3, the bearing support and sealing member 12 comprises a body 14 of resilient organic polymeric material such as urethane having a pair of spaced side surfaces 16 and 18 with an axle receiving opening 20 formed in body 14 extending from one side surface 16 thereof. A bearing supporting recess 22 is formed in body 14 coaxial with and larger than the axle-receiving opening 20 and extends from the other side surface 18 of body 14, and an integral sealing rib 24 projects from the periphery of one end of opening 20 into recess 22. The bearing support and sealing member 12 further includes an outwardly projecting mounting flanges 28 integrally formed on the periphery of body 14. Fastener receiving openings 30 are formed in the mounting flange 28, and the openings 30 are formed with countersunk recesses 32.

As shown in FIG. 2, the bearing support and sealing member 12 is secured to panel 8 by conventional fastener assemblies including bolts 32, nuts 34 and washers 36. The body 14 is secured to the panel 8 such that one side surface 18 engages a surface of panel 8 surrounding the opening 10.

Received in the bearing supporting recess 22 is an annular bearing assembly 24 such that one side surface 26 of the bearing assembly engages the surface of panel 8 surrounding the axle-receiving opening 20, and the other side surface 40 of the bearing assembly 35 engages and compresses the sealing rib 24 to provide a watertight seal preventing the entrance of water into the body 2 around the bearing assembly 35. An axle 6 is received in the bearing assembly 35 and projects through the axle-receiving openings 10 and 20 formed in the supporting panel 8 and sealing member 12, respectively.

The illustrated bearing assembly 35 comprises a conventional oil-sealed bearing assembly including plates on both sides of the ball bearings between the races to seal in oil. The sealing rib 24 engages the inner race of the bearing assembly to provide a watertight seal with the bearing race. Thus, the bearing assembly is resiliently clamped between the end wall 37 of the recess 22 and the surface of panel 8 surrounding the opening 10. Shock loads transverse to the axis of the axle shaft 6 are resiliently absorbed by the sealing member 12.

Thus, as embodied in the drawings and as shown in FIG. 2, the present invention includes a shaft and bearing support and sealing assembly including the supporting panel 8 having an opening 10 for receiving a shaft 6, a bearing support and sealing member 12 comprising a body 14 of resilient plastic material having a pair of spaced side surfaces 16 and 18. Body 14 is formed with an outwardly projecting mounting flange 28 integrally formed on at least a portion of the periphery of body 14 with means 32, 34, 36 securing the mounting flange 28 to the supporting panel 8 such that one side surface 18 of the body 14 engages a surface of the supporting panel. The shaft-receiving opening 20 formed in the body 14 is in coaxial relationship with the opening 10 in the supporting panel 8, the opening 20 extending from and communicating with the other side surface 16 of body 14 toward the supporting panel 8. The bearing supporting recess 22 formed in the body 14 is coaxial with and larger than the shaft-receiving opening 20 in the body 14, the bearing supporting recess extending from and communicating with the side surface 18 of body 14. The sealing rib 24 is integrally formed on the body at the junction between the shaft-receiving opening 20 and the bearing supporting recess 22 and projects axially into the bearing supporting recess 22, and an annular bearing assembly 35 is received in the bearing supporting recess 22 with one side surface 38 of the bearing assembly engaging with surface of the supporting panel 8 surrounding opening 10, and the other side surface 40 of the bearing assembly engaging and compressing sealing rib 24 with the shaft 6 received in the bearing assembly 35 and projecting through the openings 10 and 20 in the supporting panel and body 14, respectively.

While a specific form of the invention has been illustrated in the accompanying drawings and described in the foregoing specification, it should be understood that the invention is not limited to the exact construction shown and that alterations in the construction and arrangement of parts, all falling within the scope and spirit of the invention, will be apparent to those skilled in the art.

I claim:

1. A shaft and bearing support and sealing assembly comprising a supporting panel having an opening for receiving a shaft, a bearing support and sealing member comprising a body of resilient plastic material having a pair of spaced side surfaces, an outwardly projecting mounting flange integrally formed on at least a portion of the periphery of said body, means securing said mounting flange to said supporting panel such that one side surface of said body engages a surface of the supporting panel, a shaft-receiving opening formed in said body in coaxial relationship with the opening in the supporting panel and extending from the other side surface of said body toward said supporting panel; a bearing supporting recess formed in said body coaxial with and larger than the shaft-receiving opening in said body, said bearing supporting recess extending from said one side surface of said body, a sealing rib integrally formed on said body at the junction between said shaft-receiving opening and said bearing supporting recess and projecting axially into said bearing supporting recess, an annular bearing assembly received in said bearing supporting recess with one side surface of said bearing assembly engaging the surface of said supporting panel surrounding the opening in said panel and the other side surface of said bearing assembly engaging and compressing said sealing rib, and a shaft received in said bearing assembly and projecting through the openings in said supporting panel and said body.

2. A bearing support and sealing member comprising: a body of resilient organic polymeric material having a pair of spaced side surfaces; one of said side surfaces being engageable with a supporting panel with the other side surface disposed in spaced relationship with such supporting panel; an axle-receiving opening formed in said body and extending from said other side surface toward said one side surface; a bearing supporting recess extending from said one side surface coaxial with and larger than said axle-receiving opening and having an end wall defined at the junction between said recess and axle-receiving opening so that a bearing assembly can be retained between said end wall and a supporting panel engaged by said one side surface; an integral sealing rib projecting from said end wall into said recess and surrounding the axle-receiving opening to engage a bearing assembly received in said recess, and an outwardly projecting mounting flange integrally formed on at least a portion of said body.

3. In combination with a vehicle body portion in the form of a vertical panel with an axle-receiving opening therein, a bearing support and sealing member comprising a body of resilient plastic material having a pair of spaced side surfaces, means securing said body to said panel such that one of said side surfaces engages a surface of said panel, an axle-receiving opening formed in said body positioned in coaxial relationship with the axle-receiving opening in said panel, the axle-receiving opening in said body extending from the other side surface thereof, a bearing supporting recess formed in said body coaxial with and larger than the axle-receiving opening in said body and extending from said one side surface, an axially projecting, integral sealing rib surrounding the end of the axle-receiving opening in said body that communicates with said recess, said rib projecting into said recess, and an annular bearing assembly received in said bearing supporting recess with one side surface of said bearing assembly engaging the surface of said panel surrounding the axle-receiving opening in said panel and the other side surface of said bearing assembly engaging and compressing said sealing rib.

4. The combination claimed in claim 3 further including a wheel supporting axle received in said bearing assembly and projecting through said axle-receiving openings.